Nov. 16, 1943.  T. R. MOORE  2,334,643
DENTAL ARTICULATOR AND METHOD FOR ORIENTING CASTS THEREON
Filed Aug. 31, 1942  4 Sheets-Sheet 1

Thomas R. Moore,
Inventor.
Haynes and Koenig,
Attorneys.

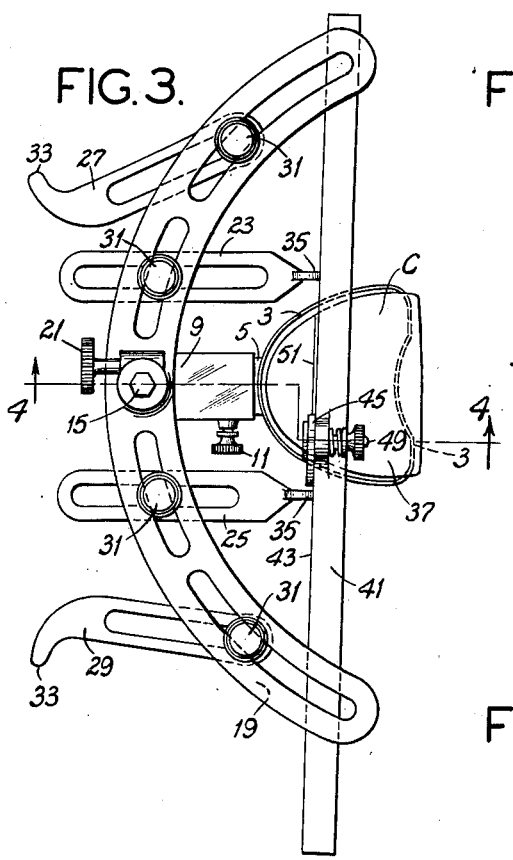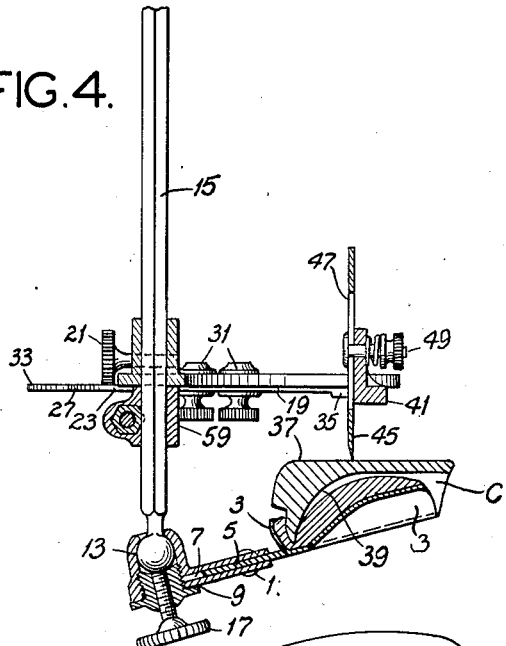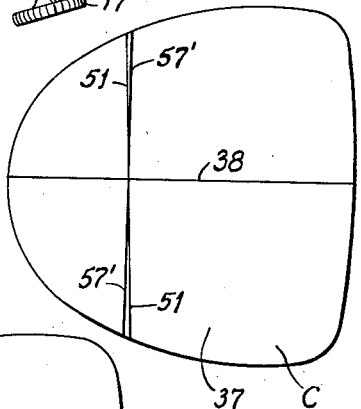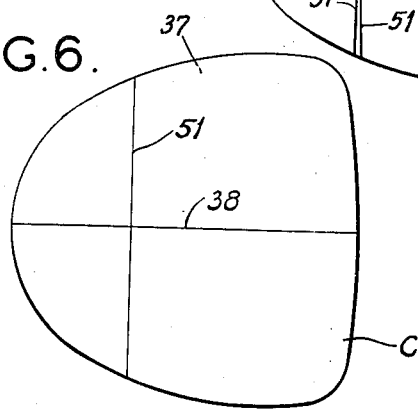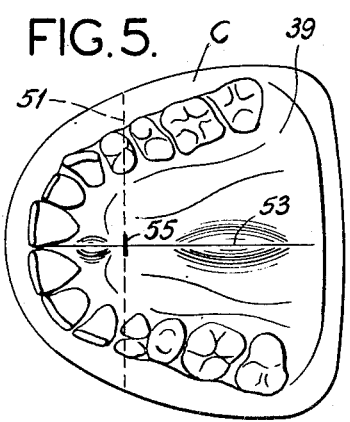

Nov. 16, 1943. T. R. MOORE 2,334,643
DENTAL ARTICULATOR AND METHOD FOR ORIENTING CASTS THEREON
Filed Aug. 31, 1942 4 Sheets-Sheet 3
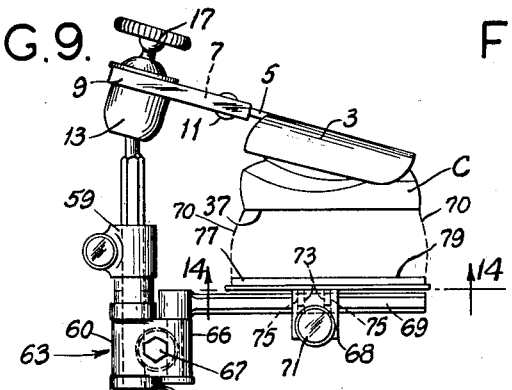
FIG. 9.
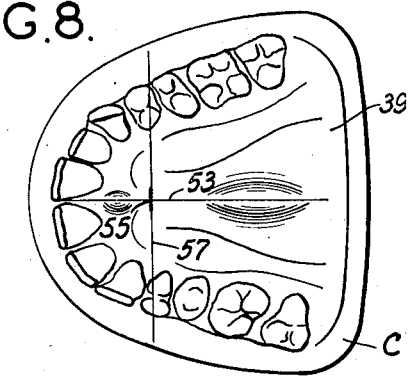
FIG. 8.
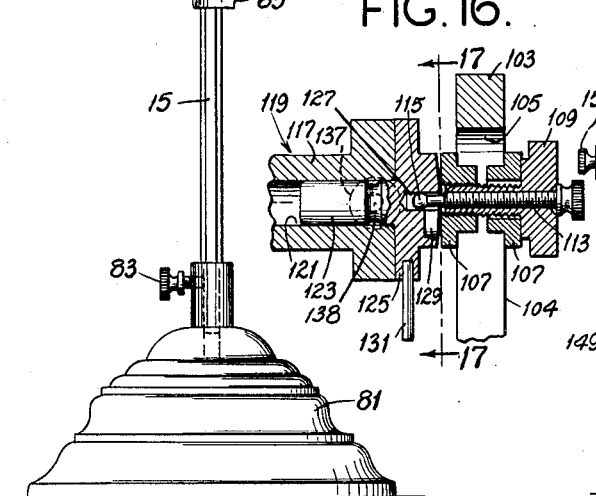
FIG. 16. FIG. 10.
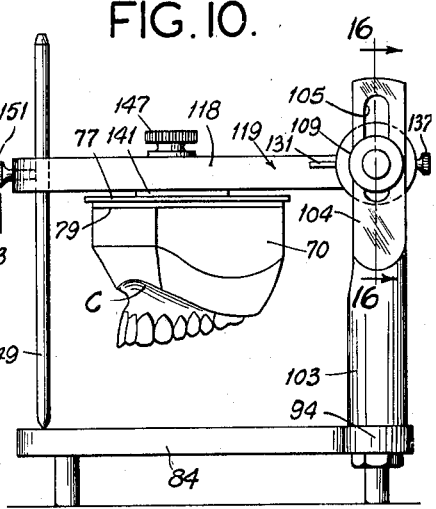
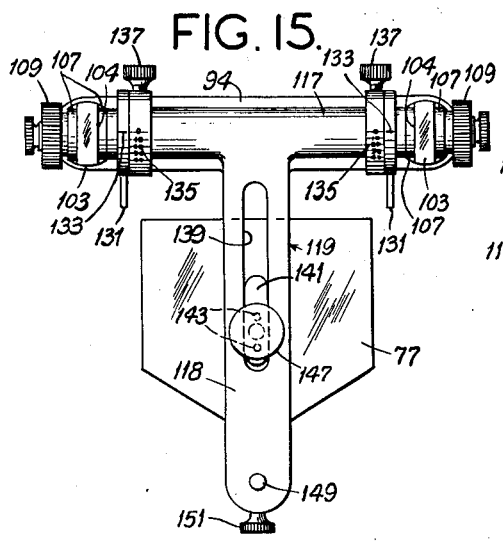
FIG. 15. FIG. 17.
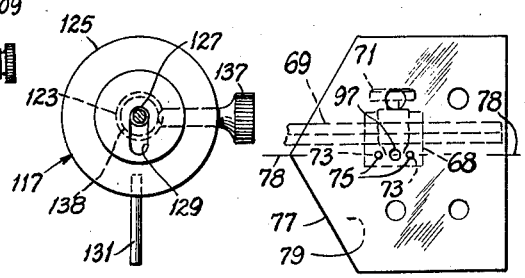
FIG. 14.
Thomas R. Moore,
Inventor.
Hayner and Koenig
Attorneys.

Nov. 16, 1943.    T. R. MOORE    2,334,643
DENTAL ARTICULATOR AND METHOD FOR ORIENTING CASTS THEREON
Filed Aug. 31, 1942    4 Sheets-Sheet 4
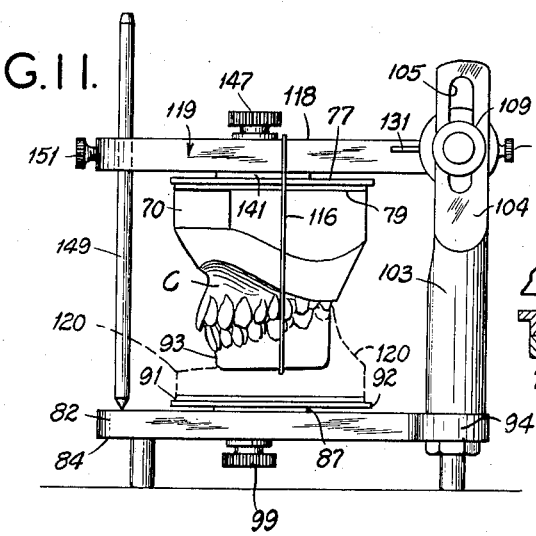
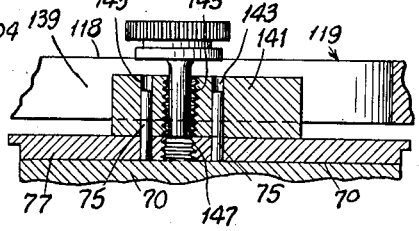
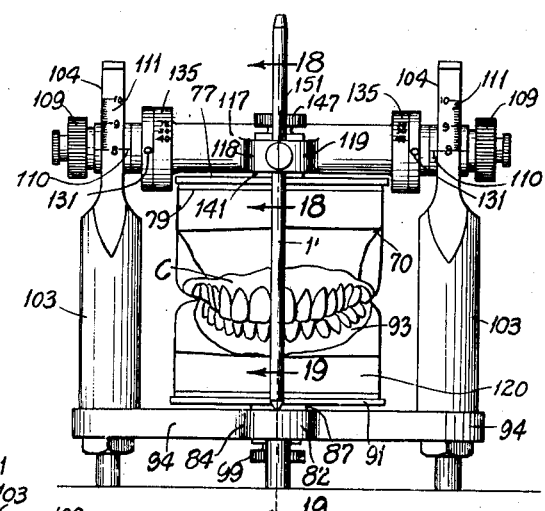
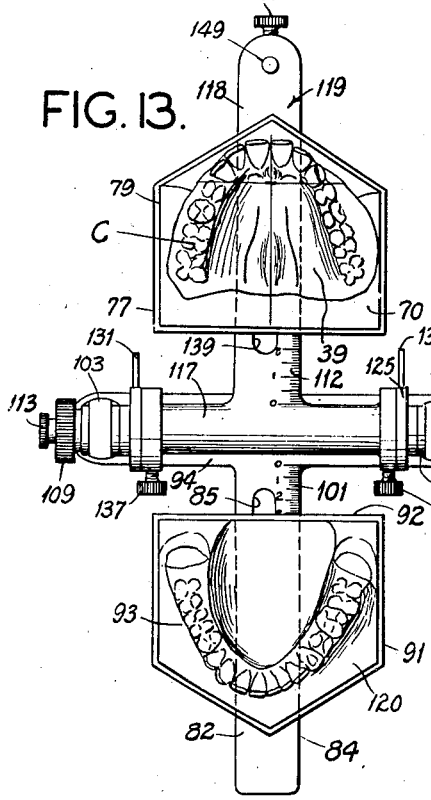
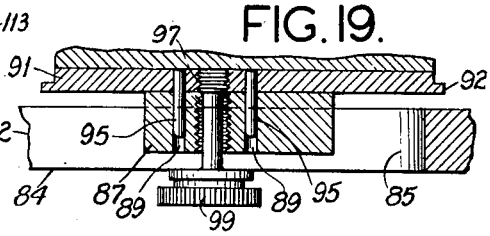

Patented Nov. 16, 1943

2,334,643

UNITED STATES PATENT OFFICE 2,334,643

DENTAL ARTICULATOR AND METHOD FOR ORIENTING CASTS THEREON

Thomas R. Moore, Rock Hill Village, Mo., assignor to The Washington University, St. Louis, Mo., a corporation of Missouri Application August 31, 1942, Serial No. 456,750

8 Claims. (Cl. 32—32)

This invention relates to a dental articulator and to a method for orienting dental casts thereon.

Among the several objects of the invention may be noted the provision of means for positioning in an articulator dental casts from a person's dental arches, in substantially the same relation to three mutually perpendicular planes in the articulator that the person's real arches have with respect to the person's mutually perpendicular orbital, median and eye-ear planes; the use on an articulator of a more reliable reference system including three rectangular coordinate planes reproducible in all heads; the provision of means for properly relating casts and reference system on the articulator; the provision of a method and apparatus of the class described which allows of measuring both maxillary and mandibular deviations with respect to said reference system rather than merely determining inter-arch relationships; and the provision of an articulator wherein deviations may be more accurately predetermined and more intelligently studied from a prosthetic viewpoint. Other objects will be in part obvious and in part pointed out hereinafter.

The invention accordingly comprises the elements and combinations of elements and arrangements of parts, steps and sequence of steps, features of construction and manipulation which will be exemplified in the structures and methods hereinafter described, and the scope of the application of which will be indicated in the following claims.

In the accompanying drawings, in which is illustrated one of various possible embodiments of the invention, Fig. 1 is a side elevation of a gnathostatic assembly of an impression tray and face bow apparatus, showing in dotted diagrammatic lines a person's head;

Fig. 3 is a view similar to Fig. 2, but showing the apparatus removed from the head, and showing a stone cast in position in an impression tray and the application of a beam marker to a face bow;

Fig. 4 is a vertical section taken on line 4—4 of Fig. 3, showing the marking of the trace of an orbital projection;

Fig. 5 is a plan view of the working surface of the cast with a median line marked upon it, along with an intersection on said line with said orbital projection;

Fig. 6 is a plan view of the back of the cast of Fig. 5, showing the median plane line projected and showing the marking referred to in connection with Fig. 4;

Fig. 7 is a view similar to Fig. 6, showing a line perpendicular to the median plane line, which perpendicular line is the trace of an orbital plane;

Fig. 8 is a view similar to Fig. 5 showing the projection trace of the orbital plane through the working surface;

Fig. 9 is a side elevation of an impression tray inverted with a cast therein, the face bow of Fig. 1 having been removed and a supporting plate positioned ready for molding, the dotted lines showing the shape of the supporting material to be cast;

Fig. 10 is a side elevation of my articulator with an upper cast mounted thereon;

Fig. 11 is a view similar to Fig. 10, with a lower unmounted cast temporarily attached to the upper mounted cast in centric relationship, and showing a lower molding plate below the upper molding plate, and showing by dotted lines molding material about to be placed;

Fig. 12 is a front elevation of the articulator assembled with both mounted casts;

Fig. 13 is a plan view of the articulator swung completely open;

Fig. 14 is a horizontal section taken on line 14—14 of Fig. 9;

Fig. 15 is a plan view of the articulator;

Fig. 16 is an enlarged section taken on line 16—16 of Fig. 10, but showing a condyle disc rotated 90°;

Fig. 17 is a section taken on line 17—17 of Fig. 16;

Fig. 18 is a section taken on line 18—18 of Fig. 12; and,

Fig. 19 is a section taken on line 19—19 of Fig. 12.

Similar reference characters indicate corresponding parts throughout the several views of the drawings.

Figure 1:
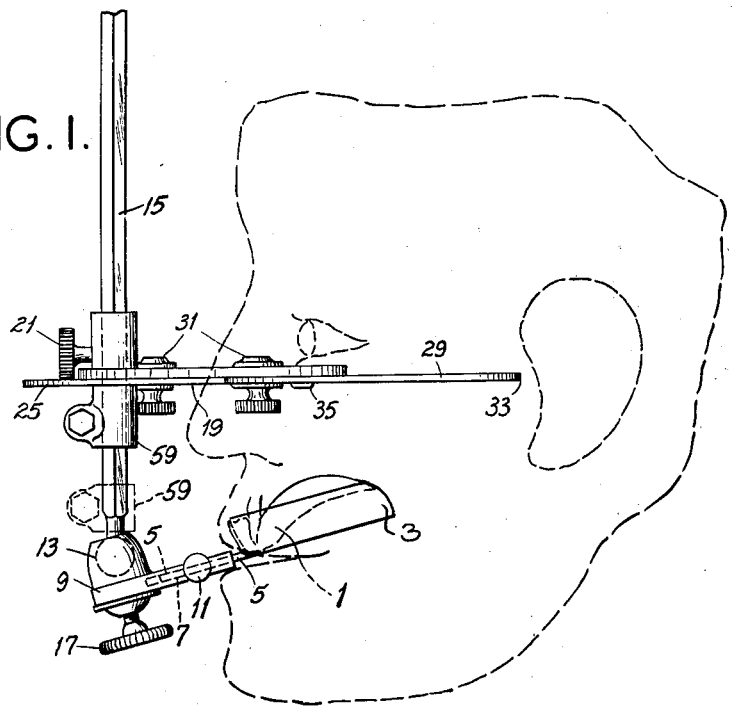

Preliminary steps consist in taking upper and lower impressions in wax from the person's mouth in the usual way. Stone casts are made from these impressions which are facsimiles of the person's mouth contours. An upper cast is shown, for example, at C in the drawings. The upper cast has what will hereinafter be referred to as a working surface 39 and a flat reference surface 37. The working surface is the significant facsimile surface received from the impression, and the reference surface is an opposite flat plane portion, made substantially parallel to the person's eye-ear plane, as will appear.

Figure 2:
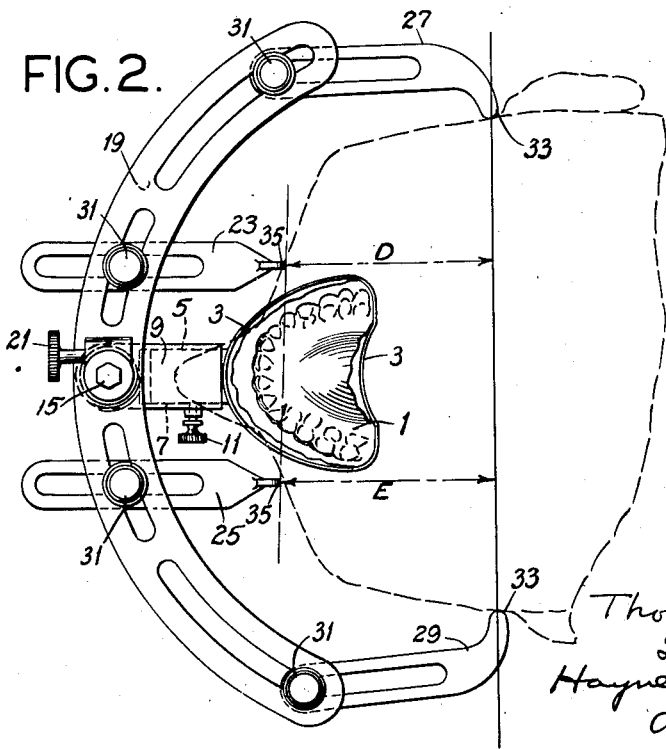
Fig. 2 is a plan view of Fig. 1.

From the cast C, a wax impression 1 is made in a tray 3 (Figs. 1 and 2). The tray 3 has a tongue 5 which slides in a groove 7 in a tray socket 9. The tray may be held in fixed position in the socket 9 by means of a set screw 11.

The arm 9 carries a universal swivel joint 13 for adjustably supporting a hexagonal guide 15. The joint 13 may be locked by means of a lock screw 17 at any adjusted position of the guide 15.

On the guide 15 is a sliding face bow 19 held in any adjusted position by a lock screw 21. The bottom surface of the face bow 19 constitutes a plane on which are movable plane index bars 23, 25, 27 and 29. Each of these bars is provided with an endwise index point in or very near the plane of the top surface of the face bow. Each bar has a double-slotted clamping connection 31 on the bow 19, so that it may be given universal movement in the plane of the face bow and clamped in any given position.

Referring now, for example, to preliminary operations in connection with the maxilla, the wax impression 1, in the face bow assembly shown in Fig. 1, is fitted to the person's maxillary dental surface and there held by an assistant. With the clamps 17, 21 and 31 loose, as required, the points 33 on the ends of the bars 27 and 29 are adjusted by the operator on the tragus points on the person's face. Tragus points are locations anterior to the ears. The end points 35 on the bars 23, 25 are placed on the orbital points on the face. Orbital points are locations just below the eyes on the lower edges of the orbits. Tragus and orbital points are substantially horizontal when a person looks straight ahead on the level. The assembly is then locked at all joints 17, 21 and 31, thus predetermining in this assembly (gnathostat) the relative locations of the person's maxillary contours, tragus and orbital points. The assembly is then removed from the person's head. The stated relationships are thus preserved in space, although they may now be moved about. Since the tragus and orbital points lie substantially in the horizontal eye-ear plane in the head, this physically relates a facsimile of the person's maxillary contour with the eye-ear plane; and since the orbital line passes through the orbital points, this also relates a facsimile of the person's maxillary contours to the orbital line. The median distance is then measured between a line 33—33 joining the tragus points on the face bow, and an orbital line 35—35 joining the orbital points on the face bow. This dimension is noted and preserved for future reference. Since the orbital line is not always precisely parallel to the line between the tragus points, this dimension is obtained by measuring between the tragus line 33—33 and orbital line 35—35 at the orbital points 35, 35, and averaging. Dotted lines D and E show these measurements which are averaged and called F hereinafter.

Next, as shown in Fig. 3, the tragus-point arms 27, 29 are loosened and swung out of the way. The stone cast above mentioned and indexed as C is replaced in the wax impression 1. It is built up to receive the flat supporting surface 37 which is parallel to the eye-ear plane of the face bow 19. The working surface 39 is at this time fitted down into the impression 1. The surface 37 is now parallel to the eye-ear plane of 19, both being perpendicular to the guide 15. An orbital beam marker 41 is then layed on or clamped to the surface of 19 and brought flush against the points 35. The beam 41 carries against its plane flush side 43 a swinging plane marker 45, which has for manipulation a slot 47 slidable around a spring-pressed pin 49. A line 51 may thus be projected upon the surface 37 of the cast C. This line 51 is in the plane 37 a perpendicular projection trace of the orbital line 35—35.

Next (Fig. 5), the cast C is turned over and the operator on its working surface 39 marks the raphe palatina 53. This is determined by the sagittal ridge or groove along the center of the palate surface. Then, by means of a symmetrograph, a point 55 is obtained on the medium line 53, which is in a plane perpendicular to surface 37 and containing line 51. Line 51, it will be recalled, is the perpendicular projection from the eye-ear plane of the orbital line. Therefore point 55 will be in this plane projection, since the symmetrograph simply has the effect of passing an imaginary plane through the line 51, perpendicular to surface 37 of the cast.

A symmetrograph is an instrument having a plane table on which are scribed mutually perpendicular lines and above one of which is a scriber guided to move exclusively in a plane including one of said lines. Any line on one side of an object which is made to coincide with the last-mentioned line on the table may have coplanar points or a line marked on its opposite side by means of the scriber point (see "Fundamental Principles of a Systematic Diagnosis of Dental Anomalies," by Dr. Paul W. Simon, 1926, page 103).

Then the median line 53 is carried in a perpendicular plane to surface 37 and marked 38 (Fig. 6). A line 57' is then drawn on the working surface 39 which is in a plane at right angles to line 38 (Fig. 7). The plane containing the line 57' is then the orbital plane, perpendicular to the eye-ear plane (to which surface 37 is parallel); and also perpendicular to the median plane containing line 53. It should be noted that the orbital plane line 57' does not necessarily include the orbital points, but simply point 55 which was obtained from the perpendicular plane including the orbital points. Finally, the line 57' may be projected in a perpendicular plane to the working surface where it is indicated as trace line 57 (Fig. 8). All line transfers are preferably done on the symmetrograph.

The above operations provide the working surface 39 of the stone cast C with mutually perpendicular intersecting lines 53 and 57. These are traces of the median plane and the orbital plane properly related to the cast C.

The next step will be to attach to the surface 37 of the cast a suitable base for proper attachment to an articulator. This is done by clamping a fixation ring 59 on the guide 15 and against the face bow 19, then removing the face bow. The guide 15 is then inverted and placed on a base 81 (Fig. 9). A sliding carriage 60 of a mold beam assembly 63 is applied to the guide, being brought up against the stop 59 where it is held in position by a clamp 65. This carriage 60 has an arm 66 swivelling on it. Horizontally swivelled on the arm 66 is a mold beam 69 on which is a slider 68 which may be held in position on the beam by a clamp 67. A clamp 67 tightens arm 66 on carriage 60, and also beam 69 on arm 66. A mold plate 77 has dowels 75 which removably enter holes 73 drilled in 68. The back surface 79 of the plate 77 is thus held perpendicular to the guide 15, and it will be remembered that the eye-ear plane of the face bow 19 was also perpendicular to the guide 13. It therefore follows that surface 79 occupies the same position that the plane 19 of the face bow occupied with respect to the cast C.

The result is the assembly shown in Fig. 9, wherein the apparatus has been inverted and held on a support 81 by a clamp 83.

It should be noted that the clamp 67 not only clamps the joint between arm 66 and the beam 69, but also the joint between the arm 66 and the sleeve 60. Therefore, it is possible to bring the center line 78 of the plate 77 (Fig. 14) under the median lines 38 on the stone cast C which has now been replaced in the impression 1. The center line runs through the centers of dowels 75. Therefore, the proper relationship can be ascertained by positioning the dowel openings 73 directly under line 38. Upstanding dowel pointer pins in the openings 73 (not shown) may be used for this purpose, if desired.

With the plate 77 on clamped slider 68, a mass of plastic material 70 is then built up on the plate 77 to connect it with the stone cast, as shown by the dotted lines. A mold form may be used at this stage, but for clarity such is not shown. These forms are known. Holes in the plate 77 insure keying of this mass to the plate. After hardening, the cast is then found to be organized with the surface 79. This predeterminately relates the median plane and orbital plane (marked on the working surface of the cast), and the plane 79 on plate 77, which is now fixed at a predetermined distance from the cast.

It is next the intention to remove this cast assembly from the mold beam assembly. This is done by removing the dowel pins 75 from the openings 73. Since the dowel pins are in the plane of the center line 78, the cast has its median line 53 centered on the mounting plate. The assembly of the maxillary cast and mounting plate is now ready for attachment to the articulator which is shown in Figs. 10–13 and 15–19. Before describing the attachment, the articulator will be described per se.

The articulator consists of a symmetrical T-shaped horizontal base 84, in the stem 82 of which is a central slot 85 for a central slider 87 which carries centered dowel openings 89 for dowel pins 95 on the center line of a lower mounting plate 91. The mounting plate 91 is for a lower stone cast 93 made from the mandible. It is mounted last. The dowel pins 95 engage the dowel openings 89. A threaded opening 97 in plate 91 is engaged by the threaded end of the clamp screw 99, which not only holds the plate 91 to the slider 87 but also clamps the slider 87 at any predetermined point in the groove 85. Millimeter index markers 101 on 82 permit of setting the plate 91 in predetermined positions on the member 84, or of determining its position. The rear edge 92 of the plate 91 traverses the index 101.

At the ends of the head 94 of the T-shaped member 84 are symmetrical posts 103 slotted at upper flats 104, as indicated at 105. On opposite sides of each slot are sliders 107 (Fig. 16). Through the outer sliders freely pass thumb screws 109, respectively. The screws are threaded into the inner sliders respectively. By this means the sliders may be relatively loosened or tightened to be adjusted in the slots 105, and they may be clamped at any given position. Millimeter marker scales 111 provide for quantitative elevational settings.

Threaded through each thumb screw 109 is an adjustable gudgeon 113. The inner ends 115 of the gudgeons 113 may thus be adjusted axially. They constitute condyle centers.

Located between the inner sliders 107 is a lateral shank 117 of a symmetrical T-shaped member 119. This shank 117 is axially bored from opposite ends, as shown at 121, for receiving shanks 123 of coaxial condyle discs 125. The latter are bored axially at the ends as shown at 127 to receive the ends 115 of the gudgeons 113 when the latter are screwed into the members 109 the maximum amount. Radially cut from the bores 127 on the outer surfaces of the discs 125, but not as deep as these bores 127, are condyle slots 129. These slots may traverse the gudgeon ends 115 when said ends 115 are partially withdrawn, that is, from the bores 121, but not clear of the outer surfaces of the discs 125. The outsides of the discs 125 are rounded, as shown, so that the shank 117 may angle between inner slides 107, when the gudgeons 113 play in slots 129. Pins 131 extend from the edges of the discs parallel to the slots 129. Markers 133 are also employed which traverse angular index marks 135 on the flanged ends of the shank 117. Set screws 137 operating on retaining grooves 138 in the gudgeons 123 permit of independent angular adjustments and clamping of the discs 125, thus permitting of any required adjustments to meet any special condyle conditions known to exist in a person. Also, the slides 107 may be loosened and independently adjusted up and down in order later to correct independently for each condyle elevation.

The stem 118 of the T-shaped member 119 also has a central slot 139 carrying a central slide 141. Slide 141 has central dowel openings 143 and a threaded opening 145 for receiving the threaded end of a clamp screw 147 (Fig. 18). The dowel openings 143 are on the center line of the slot 139, and are adapted to receive the central dowels 75 in the upper plate 77. This upper plate, by means of scale 112, is adjusted so that the line 57 is ahead of the condyle center line of shank 117 the distance F, above mentioned, minus 1 cm. This distance F was mentioned in connection with Fig. 2 as the average of D and E. This properly positions the orbital plane of the upper cast with respect to the condyles on the articulator.

An incisal pin 149 is held by a set screw 151 in an opening at the end of the member 119. It holds the upper member 119 parallel to the lower member 84, both being preferably horizontal.

The center lines of the members 84 and 119, with respect to the condyles are in a vertical plane, which in the articulator represents the median plane. This median plane passes through the dowel pins 75 and 95. Hence when the upper cast assembly is applied, its median plane is automatically in the median plane of the articulator. The sliders 107 and the incisal pin 149 are adjusted by reference to scales 111 so that the bottom surface 79 of the plate 77 is horizontal and 8 cm. from the top of the lower plate 91, to be further described. This is an arbitrary dimension which properly relates the plates 77 and 91 so that later proper articulation of both casts will occur. The pointer lines for scales 111 are shown at 110 on the inner slide clamps 107. In the articulator, the eye-ear plane is now at right angles to the median plane and the orbital plane, and at the predetermined correct elevation. The orbital plane is at the correct distance ahead of the condyles.

After the upper cast assembly and plate are in position on the extension or beam 119, the lower plate 91 is placed on slide 87 and brought into position directly beneath the upper plate 77. Then after having made a lower stone cast 93 from an impression taken from the person's lower jaw, this cast is centrically supported from the bottom against the upper cast C by means of a ligature 116 as shown in Fig. 11. Molding material 120 is filled in between the lower plate 91 and the lower cast 93, thus permanently relating the lower cast properly to the upper cast and on the articulator. Thus both casts are properly related on the articulator. At this time the unwanted parts of the ligature 116 are cut away. The lines 53 and 57 (Fig. 8) may be projected down perpendicularly into the lower cast 93, if desired. This is done in the Figs. 11 and 12 position.

An important feature is that the casts are by this method and apparatus set up in the articulator with the median, orbital and eye-ear planes properly related to the casts and properly related to the corresponding planes in the articulator, thus substantially duplicating as between casts and articulator the relationship of the person's arches to these planes in the head. Thus, any desired motions and deviations that the dentist wishes to bring about may be quantitatively studied. For example, the amounts of the independent adjustments of the slides 107 with respect to the index characters 111 to bring about a desired effect may be noted; also the amount of angular adjustments of the discs 125 in order to obtain a desired articulation. Posterior and anterior corrective adjustments necessary may be quantitatively determined at the indices 112 and 101.

In view of the above, it will be seen that the several objects of the invention are achieved and other advantageous results attained.

As many changes could be made in the above constructions and methods without departing from the scope of the invention, it is intended that all matter contained in the above description or shown in the accompanying drawings shall be interpreted as illustrative and not in a limiting sense.

I claim:

1. A dental articulator comprising a lower frame for a mandibular cast, two supports on said lower frame, a gudgeon on each support, each gudgeon having a sliding attachment to its support independent of the other gudgeon, an upper frame, and condyle joints carried in part by said upper frame and composed in part by said gudgeons.

2. An articulator comprising a lower frame, an upper frame, supporting posts on the lower frame, slots in said posts, independent sliding clamp means in the respective slots, independent gudgeons associated with said clamp means respectively, coaxial condyle joint parts on the upper frame cooperable with said gudgeons, each joint part comprising a member having an axial bearing of one depth and a radial slot therefrom of another depth, said gudgeons being axially movable with respect to their associated clamps to move into the coaxial bearings for pure rotary movement of the upper frame, or merely into the radial slot for effecting relative rocking movement of the upper frame.

3. An articulator comprising a lower frame, an upper frame, supporting posts on the lower frame, slots in said posts, independent sliding clamp means in the respective slots, independent gudgeons associated with said clamp means respectively, coaxial condyle joint parts on the upper frame cooperable with said gudgeons, each joint part comprising a member having an axial bearing of one depth and a radial slot therefrom of another depth, said gudgeons being axially movable with respect to their associated clamps to move into the coaxial bearings for pure rotary movement of the upper frame, or merely into the radial slot for effecting relative rocking movement of the upper frame, and means for adjustably rotating said joint parts on the upper frame in order to adjust the respective angles of said slots.

4. An articulator comprising a lower frame having a guide, an upper frame having a guide, slides in the guides for supporting dental casts, supporting posts on the lower frame, slots in said posts, independent sliding clamp means in the respective slots, independent gudgeons associated with said clamp means respectively, coaxial condyle joint parts on the upper frame cooperable with said gudgeons, each joint part comprising a member having an axial bearing of one depth and a radial slot therefrom of another depth, said gudgeons being axially movable with respect to their associated clamps to move into the coaxial bearings for pure rotary movement of the upper frame, or merely into the radial slot for effective relative rocking movement of the upper frame, and index means for setting the upper slide in its guide at a predetermined distance from the center line between the condyle joints, and index means on each of the clamp means in the posts for predetermining the elevation of the upper frame.

5. In an articulator, a base, supports on the base, a swinging member, an adjustable incisal pin adapted to be supported on the swinging member, condyle joints between the swinging member and the respective supports, independent vertical adjustments for the respective condyle joints whereby in connection with said incisal pin the swinging member may be initially set parallel to and at a predetermined distance from the base, guides respectively in the swinging member and in the base perpendicular to a plane including the condyle centers, slides in the guides, upper and lower supporting plates, attachment means between the upper supporting plate and its respective slide, the attachment means being predeterminately positioned on the plate with respect to a median plane drawn on a cast molded to the plate whereby said median plane may be set in a median position with respect to said condyle joints.

6. In an articulator, a base, supports on the base, a swinging member, an adjustable incisal pin adapted to be supported on the swinging member, condyle joints between the swinging member and the supports, independent vertical adjustments for the respective condyle joints whereby in connection with said incisal pin the swinging member may be initially set parallel to and at a predetermined distance from the base, guides in the swinging member and in the base perpendicular to a plane including the condyle centers, slides in the guides, supporting plates, attachment means on the supporting plates and respective slides, said attachment means being predeterminately positioned on the plates with respect to median and orbital planes drawn on casts molded to the plates whereby said median plane may be set in a median position with respect to said condyle joints, the plates being so attached to the slides that an eye-ear plane related to the casts is substantially parallel to the base member and swinging member when said base and swinging members are parallel.

7. In an articulator, a base, supports on the base, a swinging upper member, an adjustable incisal pin adapted to be supported on the swinging member, condyle joints between the swinging member and the supports, independent vertical adjustments for the respective condyle joints whereby in connection with said incisal pin the swinging member may be initially set parallel to and at a predetermined distance from the base, a guide in the swinging member perpendicular to a plane including the condyle centers, a slide in the guide, a supporting plate, attachment means on the supporting plate and respective slide, said attachment means being predeterminately positioned on the plate with respect to median and orbital planes drawn on an upper cast molded to the plate whereby said median plane may be set in median position with respect to said condyle joints, the plate being so attached to its slide that an eye-ear plane related to the cast is substantially parallel to the base and swinging member when they are parallel, and means for determining the setting of the slide on the articulator so that an orbital plane related to the cast is at a predetermined distance from said center line.

8. In an articulator, two members articulated on spaced condyle centers which may be placed upon a predetermined horizontal center line, supports upon which the condyle centers are independently adjustable, both of said members having guides in planes perpendicular to said center line, one of the members having an adjustable incisal pin for maintaining the guides parallel, slide means in the guides having attaching means, supporting plates for casts having means for removable attachment to said attaching means, the attaching means being arranged so that the median plane of the casts is automatically upon attachment placed substantially in the median plane of the articulator, index means marked on the articulated members for predeterminately positioning reference points on said plates with respect to said condyle center line, and index means marked on said supports for predeterminately positioning reference points on the condyle centers.

THOMAS R. MOORE.